United States Patent [19]
Hoshino et al.

[11] Patent Number: 5,176,957
[45] Date of Patent: Jan. 5, 1993

[54] BEAD WIRE FOR TIRE, RUBBER-COATED BEAD WIRE FOR TIRE AND TIRE USING THE SAME

[75] Inventors: Hiroshi Hoshino; Shinichi Miyazaki, both of Kobe, Japan

[73] Assignee: Sumitomo Rubber Industries, Ltd., Kobe, Japan

[21] Appl. No.: 619,992

[22] Filed: Nov. 30, 1990

[30] Foreign Application Priority Data

Dec. 5, 1989 [JP] Japan ................... 1-317125

[51] Int. Cl.⁵ ................... B32B 15/00; B32B 15/06
[52] U.S. Cl. ................... 428/389; 428/373; 428/375; 428/379; 428/364; 428/625; 428/646; 428/647; 428/674; 428/677
[58] Field of Search ............... 428/379, 389, 364, 375, 428/606, 607, 625, 646, 647, 677

[56] References Cited

U.S. PATENT DOCUMENTS

| | | | |
|---|---|---|---|
| 2,135,886 | 11/1938 | Elder | 428/625 |
| 3,858,635 | 1/1975 | Nakamoto et al. | 428/677 |
| 3,869,261 | 3/1975 | Katsuma | 428/647 |
| 3,961,740 | 6/1976 | Nakamoto et al. | 428/677 |
| 4,683,175 | 7/1987 | Bakewell et al. | 428/375 |
| 4,704,337 | 11/1987 | Coppens et al. | 428/677 |

FOREIGN PATENT DOCUMENTS 50-2036241 2/1990 Japan ................... 428/625

Primary Examiner—Patrick J. Ryan
Assistant Examiner—J. M. Gray

[57] ABSTRACT

Bead wire comprising a core head wire plated with a Cu/Sn deposit wherein the deposit has a Sn content of 9 to 13% by weight and a Cu content of 91 to 87% by weight and the deposit is in an amount of 0.65 to 0.85 g per kilogram of the core bead wire. The bead wires of the present invention provides excellent adhesion between the plated bead wire and the rubber layer.

1 Claim, 2 Drawing Sheets

BEAD WIRE FOR TIRE, RUBBER-COATED BEAD WIRE FOR TIRE AND TIRE USING THE SAME

BACKGROUND OF THE INVENTION

The present invention relates to a bead wire for tires, a rubber-coated bead wire for tires and a tire using the rubber-coated bead wires, and more particularly to a bead wire for tires which is plated with a metal mixture having a specific weight ratio in a specific amount, a rubber-coated bead wire for tires which is obtained by coating the specifically plated bead wire as mentioned above with a specific rubber composition and a tire prepared by using the rubber-coated bead wires as mentioned above.

In general, as to bead wires for tires, in order to improve an adhesion between a bead wire and a rubber layer formed on the bead wire, particularly, when using the bead wires in a tire, to improve a deterioration of the adhesion resulting from a stress and heat caused by running the tire, the bead wire for tires is Cu/Sn-plated then the plated bead wire is combined with a rubber composition which is coated on the plated bead wire (hereinafter referred to as "bead-coating rubber composition), and the obtained rubber-coated bead wire is used for bead cores in a tire.

Adhesion reaction between the bead wire and the rubber layer occurs during a vulcanization step which is one step of the tire preparation steps. It is said that the adhesion reaction is caused between the bead wire and the rubber layer by the vulcanization to form a reaction layer. In order to obtain an excellently adhering state, it is necessary to obtain a reaction layer wherein the bead wire reacts with the rubber layer to form excellent adhesion.

Observing the rubber layer on the bead wire, as to the deterioration of the adhesion of tires practically used, there are some tires wherein the peeling is caused in the reaction layer, which sometimes exerts a bad influence on the life of tires. When the bead wire does not strongly react with the rubber layer (the reaction layer does not have the excellent adhesion), the adhesion between the bead wire and the rubber layer is lowered by the stress and heat generated during the running of tires. In a remarkable case, the rubber layer is peeled off from the bead wire, and more remarkably, there is a case that the bead wires protrude from the tire (such a damage of the bead portions is referred to as "wild wire"). Since the occurrence of the above-mentioned disadvantages significantly relates to the stress and heat applied to the bead portions, the disadvantages are easily caused in tires used under conditions of heavy load and high speed such as tires for airplanes which must bear a heavier load than loads applied to tires used in other categories which must withstand a high speed such as not less than 300 km/hour.

In order to reduce the disadvantages as mentioned above, there has been known a method wherein triazine thiols are used as a crosslinking auxiliary for adhesion reaction between the rubber layer and the bead wire. When applying the method to tires used under the conditions of heavy load and high speed, for instance tires for airplanes, however, the adhesion is unsatisfactory and the cost becomes high.

An object of the present invention is to provide a bead wire for tires having an excellent adhesion.

A further object of the present invention is to provide a rubber-coated bead wire for tires having an excellent adhesion between the bead wire and the rubber layer.

A still further object of the present invention is to provide a tire overcoming the disadvantages as mentioned above.

These and other objects of the present invention will become apparent from the description hereinafter.

SUMMARY OF THE INVENTION

It has now been found that when a specific plating deposit is made on a bead wire, the plated bead wire can have the excellent adhesion. Also, when a rubber composition having a specific composition is combined with the plated bead wire as mentioned above, the obtained rubber-coated bead wire can be improved in adhesion between, the plated bead wire and the rubber layer. Further when tires are prepared by using the rubber-coated bead-wires having the improved adhesion as mentioned above in the bead portions, the above-mentioned disadvantages of the conventional tires can be reduced.

In accordance with the present invention, there is provided a core bead wire having a Cu/Sn deposit plated thereon with an Sn content of 9 to 13 % by weight and a Cu content of 91 to 87 % by weight in an amount of 0.65 to 0.85 g plated thereon per kilogram of the wire.

Also, in accordance with the present invention, there is provided a rubber-coated bead wire for tires which comprises a core bead wire with a Cu/Sn deposit plated thereon with an Sn content of 9 to 13 % by weight and a Cu content of 91 to 87 % by weight in an amount of 0.65 to 0.85 g of plating deposit per kilogram of the core wire and a rubber layer formed on the bead wire from a composition comprising 100 parts by weight of a rubber polymer, 80 to 140 parts by weight of a carbon, 4 to 10 parts by weight of sulfur, 0.4 to 0.9 part by weight of a vulcanization accelerator, 10 to 17 parts by weight of zinc oxide and 1 to 4 parts by weight of stearic acid.

Further, in accordance with the present invention, there is provided a tire comprising bead portions having bead cores prepared by circularly winding rubber-coated bead wires and a carcass rolled up from the inside in the axial direction of the tire toward the outside around the bead core; the rubber-coated bead wire comprising a bead wire having a Cu/Sn-deposit plated thereon with an Sn content of 9 to 13 % by weight and a Cu content of 91 to 87 % by weight in an amount of 0.65 to 0.85 g plating deposit per kilogram of the wire and a rubber layer formed on the bead wire from a composition comprising 100 parts by weight of a rubber polymer, 80 to 140 parts by weight of a carbon, 4 to 10 parts by weight of sulfur, 0.4 to 0.9 part by weight of a vulcanization accelerator, 10 to 17 parts by weight of zinc oxide and 1 to 4 parts by weight of stearic acid.

DETAILED DESCRIPTION

Figure 1:
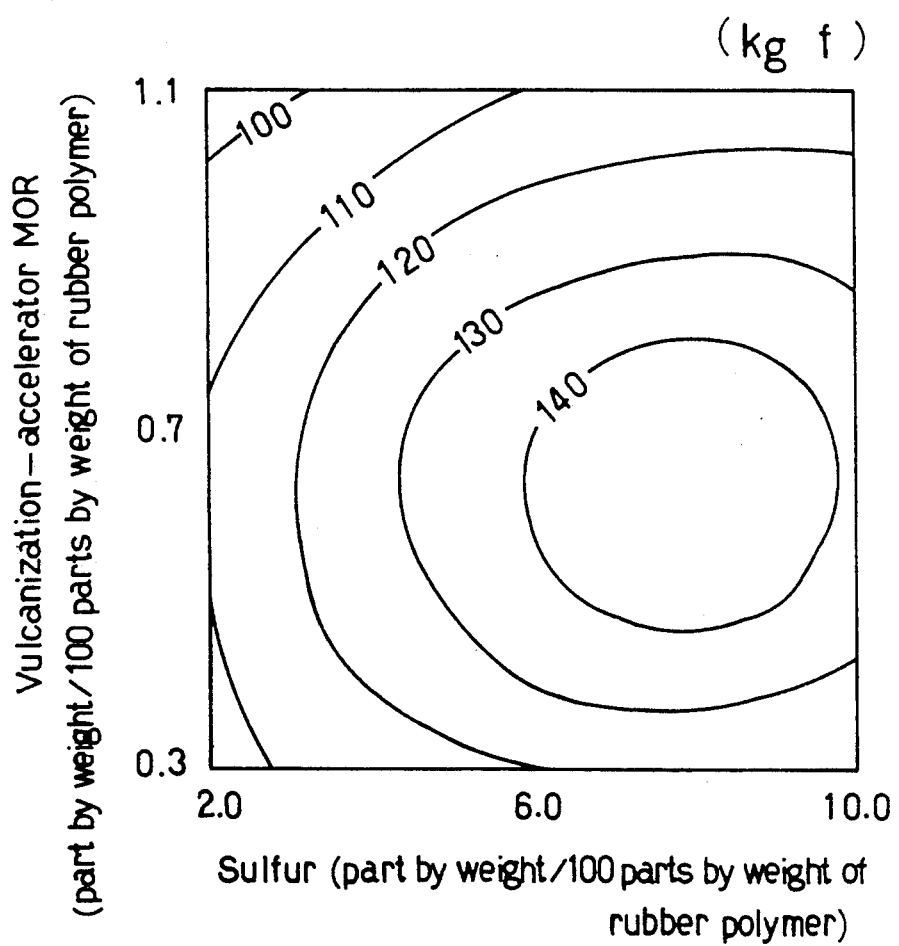
FIG. 1 is a graph showing how a drawing strength of rubber-coated bead wires obtained in Example 6 varies depending on amounts of a vulcanization accelerator, MOR and sulfur.

It is generally said that it is important that a vulcanization rate of the bead-coating rubber composition is matched with an adhesion rate between the bead wire and the rubber layer with respect to the adhesion reaction between the bead wire and the rubber layer.

On the other hand, as to the rubber used in the rubber layer formed on the bead wire, generally, the vulcanization rate must be higher, in other words a scorch time ($t_2$) and a 90 %-vulcanizing time ($T_{90}$) must be shorter than vulcanization rates of components used in other portions of the tire, since the rubber layer on the bead wire is placed in the internal position of the tire. If the vulcanization rate of the rubber layer on the bead wire is slow, the cure of the rubber is insufficient.

It has now been found that in order to obtain the more excellent adhesion between the rubber layer having the vulcanization rate as mentioned above and the bead wire, it is better that the rate of the adhesion reaction between the bead wire and the rubber layer is further increased. Further, it has now been found that when the composition of the deposit on the bead wire is specified to Cu and Sn, and the weight ratio of the two metals and the amount of the deposit are within specific ranges, the vulcanization rate is matched with the adhesion rate to effectively obtain the excellent adhesion. Also, when the rubber layer is formed on the plated bead wire from the specific rubber composition, a more excellent adhesion can be obtained.

In the present invention, the core bead wire is Cu/Sn-plated, and the deposit on the core bead wire has an Sn content of 9 to 13 % by weight, preferably from 10 to 12 % by weight and a Cu content of 91 to 87 % by weight, preferably from 90 to 88 % by weight. The amount of the plating deposit is from 0.65 to 0.85 g, preferably from 0.70 to 0.80 g, per kilogram of the wire.

In the present invention, steel wires to be plated are not particularly limited. Any bead wire can be used, so long as it is generally used as a bead wire for a tire. For instance, hard steel wires having a diameter of 0.97 mm or 1.55 mm, can be used. Among them, high carbon steel wire rods according to Japanese Industrial Standards (JIS) G 3506 and JIS G 3502, for instance, SWRH 67A and SWRH 72A according to JIS G 3506 and SWRS 77A and SWRS 82A according to JIS G 3502 are preferable from the viewpoints of the physical properties such as tensile load, elongation and torsion number.

Only when the bead wire has the Cu/Sn-deposit having the weight ratio of the two metals as specified above in the amount as specified above, the lowering of the adhesion between the bead wire and the rubber layer is effectively prevented. Particularly, the plated bead wire of the present invention is preferably used in tires used under conditions of heavy load and high internal pressure such as tires for airplanes.

When the Sn content in the deposit is less than 9 % by weight, the activation of the adhesion reaction caused by the plating is increased to increase the adhesion rate. In obtaining a vulcanization rate matching with such an adhesion rate, burning is caused during the steps. On the other hand, when the Sn content is more than 13 % by weight, the activation of the adhesion reaction caused by the plating is decreased to decrease the adhesion rate. If obtaining a vulcanization rate matching with such an adhesion rate, the rubber is undercured, that is, the rubber is insufficient by cured during the vulcanization step.

Also, when the bead wire is Cu/Sn-plated in an amount of less than 0.65 g per kilogram of the wire, the activation of the adhesion reaction caused by the plating is decreased to decrease the adhesion rate. If obtaining the vulcanization rate matching with such an adhesion rate, the rubber is undercured during the vulcanization. On the other hand, when the amount is more than 0.85 g per kilogram of the wire, the activation of the adhesion rate caused by the plating is increased to increase the adhesion rate. In obtaining the vulcanization rate matching with such an adhesion rate, the burning is caused during steps.

In the present invention, methods for Cu/Sn-plating the bead wire are not particularly limited, and usual methods such as an electroless plating method and thermal diffusion method are applicable to the plating method of the present invention.

The degree of plating is not particularly limited, and the plating having the uniformity equal to the uniformity of the plating of the usually plated bead wires for tires can suffice for the present invention.

Then, in the present invention, the bead wire as plated above is covered with the specific rubber composition. Next, the bead wire for tires which is coated with the rubber (rubber-coated bead wire) is explained.

The reason why the plated bead wire for tires is coated with the rubber composition is that, as mentioned above, the reaction layer wherein the adhesion reaction is sufficiently conducted (strong adhesion reaction) is formed between the plated bead wire and the rubber layer to make the adhesion between the bead wire and the rubber layer excellent, thus resulting in the improvement of the durability of the bead core.

In the present invention, the rubber composition to be coated on the plated bead wire (bead-coating rubber composition) comprises the rubber polymer, the carbon, sulfur, the vulcanization accelerator, zinc white (zinc oxide) and stearic acid.

The rubber polymer is one of principal components of the bead-coating rubber composition and is used for obtaining elastomeric properties. Examples of the rubber polymers are, for instance, a natural rubber, a blend of a natural rubber and isoprene rubber, a blend of a natural rubber, isoprene rubber and liquid isoprene rubber, a blend of a natural rubber and SBR (styrene butadiene rubber), and the like. The rubber polymers are not limited thereto and any rubber polymer can be used so long as it is usually used as the rubber polymer in the bead-coating rubber composition.

The carbon is a principal component of the bead-coating rubber composition together with the rubber polymer and is used for increasing the reinforcement of the rubber.

The particle size of the carbon is not particularly limited and any carbon can be used so long as it is usually used in the bead-coating rubber composition. As the carbon, GPE (General Purpose Furnace) and FEF (Fast Extruding Furnace) and their mixture are preferable from the viewpoints of the cost and processability.

The amount of the carbon is from 80 to 140 parts by weight, preferably from 100 to 140 parts by weight, based on 100 parts by weight of the rubber polymer. When the amount of the carbon is less than 80 parts by weight, the hardness is unsatisfactory, so it is difficult to use as the bead cores of tires used under the conditions of heavy load and high speed. On the other hand, when the amount is more than 140 parts by weight, the viscosity (Mooney viscosity) is high, so it is difficult to prepare tires.

Sulfur is used for obtaining the excellent adhesion, in other words an adhesive strength and a percentage of bead wires to which the rubber adheres, between the Cu/Sn-plated bead wire as specified above and the rubber layer as well as vulcanizing the rubber polymer. The term "percentage of bead wires to which the rubber adheres" used herein means a percentage of bead wires having no metal gloss, to which the rubber adheres after the plated bead wire is embedded into the rubber composition and the wire is drawn. The purity of sulfur is not particularly limited, and any sulfur can be used so long as it is usually used for vulcanizing rubbers for tires.

The amount of sulfur is from 4 to 10 parts by weight, preferably from 6 to 8 parts by weight, based on 100 parts by weight of the rubber polymer. When the amount of sulfur is less than 4 parts by weight, the amount of sulfur used in the vulcanization reaction of the rubber and the adhesion reaction between the plated bead wire and the rubber layer is in short supply, as a result, the excellent adhesion cannot be obtained. On the other hand, when the amount is more than 10 parts by weight, the blooming of sulfur on the mixed rubber stock (before vulcanization) is caused, which is disadvantageous on the preparation.

As the vulcanization accelerator used in the present invention, usual vulcanization accelerators can be used. Examples of the vulcanization accelerators are, for instance, thiazole accelerators such as M (2-mercaptobenzothiazole), DM (dibenzothiazyl disulfide) and MZ (zinc salt of 2-mercaptobenzothiazole), sulfenamide accelerators such as CZ (N-cyclohexyl-2-benzothiazolysulfenamide), NS(N-tert-butyl-2-benzothiazolysulfenamide, MOR (N-oxydiethylene-2-benzothiazolylsulfenamide) and DZ (N,N-dicyclohexyl-2-benzothiazolylsulfenamide), dithiocarbamate accelerator such as EZ (zinc diethyldithiocarbamate), BZ (zinc D-n-butyldithiocarbamate), PX (zinc ethylphenyldithiocarbamate) and ZP (zinc N-pentamethylene dithiocarbamate), guanidine accelerators such as D (1,3-diphenylguanidine), DT (di-o-tolylguanidine), BG (1-o-tolylbiguanidine) and PR (di-o-tolylguanidine salt of dicatechol borate), thiuram accelerators such as TT (tetramethylthiuramdisulfide), TET (tetraethylthiuramdisulfide), TBT (tetrabutyl-thiuramdisulfide) and TS (tetramethylthiurammonosulfide), and the like. Among the vulcanization accelerators, MOR which has a long scorch time ($t_2$) and a fast vulcanization rate ($T_{90}$) and blends of MOR and an other vulcanization accelerator are preferable from the viewpoints of burning in the steps and undercure.

The amount of the vulcanization accelerator is from 0.4 to 0.9 part by weight, preferably from 0.6 to 0.8 part by weight, based on 100 parts by weight of the rubber polymer. When the amount of the vulcanization accelerator is less than 0.4 part by weight, the vulcanization rate of the rubber on the bead wire becomes slow, so the rubber is undercured. On the other hand, when the amount is more than 0.9 part by weight, the vulcanization rate is increased, so the burning occurs during the preparation steps.

Zinc white is reacted with stearic acid to give zinc stearate functioning as a vulcanization auxiliary.

In a case that sulfur is used in a large amount compared to the used amount of the rubber polymer, as in the present invention, the use of a small amount of zinc stearate provides the insufficient proceeding of vulcanization, and the use of a large amount of zinc stearate provides the crystallization of the rubber component and the lowering of the breaking strength of the rubber on the bead wire. From the above-mentioned viewpoints, the amount of the zinc white is from 10 to 17 parts by weight, preferably from 12 to 15 parts by weight, based on 100 parts by weight of the rubber polymer. Also, the amount of stearic acid is from 1 to 4 parts by weight, preferably from 2 to 3 parts by weight, based on 100 parts by weight of the rubber polymer.

As mentioned above, since zinc white and stearic acid react to form zinc stearate, and the formed zinc stearate functions as the vulcanization accelerator, it is possible to use zinc stearate instead of zinc white and stearic acid in the bead-coating rubber composition. However, when zinc stearate is used from the beginning, the vulcanization is accelerated in excess, so, the time capable of handling is shortened. Accordingly, it is preferable to use the combination of zinc white and stearic acid.

The rubber-coated bead wires of the present invention prepared by forming the rubber layer on the above-mentioned plated bead wire from the above-mentioned bead-coating rubber composition are used as the bead cores. The bead core is prepared by circularly winding a desired number of the rubber-coated bead wires (for instance, about 5 to 30 wires) arranged side by side in a row desired turns (for instance, about 5 to 40 turns) so as to set a turn on a previous turn.

The thus obtained, wound bead wires can be used as they are as the bead cores in the preparation of the tires. When rubber layers are formed on an upper portion (tread side) and both sides, preferably the upper portion, a bottom portion (axial side) and the both sides of the wound bead wires and they are used as the bead cores, the occurence of the wild wire can be prevented. Although the reason why the occurence of wild wire can be prevented by using the wound rubber-coated bead wires on which the rubber layers are formed as the bead cores is not clear, it can be assumed as follows:

The bead portions are fatigued by the compression shear strength caused by the rotation of the tire and the temperature elevation caused by the heat generation and conduction of break heat to deteriorate the adhesion between the bead wire and the rubber layer, thus resulting in that the bead wires can easily move. On the other hand, since while rotating, the tires receive the load, the force is applied to the bead wire in the opposite direction to the rotation direction of the tires. Particularly, when the winding direction of the bead wires agrees with the rotation direction of the tire, the end portions of the wound bead wires are peeled by the impact caused by the rotation of tire, and they repeat compression propagation to reach the compression fracture of the bead wires, thus resulting in that the cut bead wires move toward the rotation direction and protrude from the tire. When the rubber layers are formed on, particularly the upper portion and both the sides, however, the impact caused by the rotation of tire is alleviated to decrease the deterioration of adhesion.

As the rubber layer to be formed on the circularly wound bead wires, it is preferable that the same rubbers as used in the bead-coating rubber composition are used and are formed in a thickness of about 0.5 to 1.5 mm.

In the present invention, the bead cores which are the circularly wound rubber-coated bead wires so as to set a turn on a previous turn, preferably the bead cores which are the circularly wound bead wires having the rubber layers formed on their upper portion and both sides, more preferably the bead cores which are the circularly wound bead wires having the rubber layers formed on their upper portion, both sides and bottom portion are wrapped up in a canvas for wrapping bead core which is coated with a rubber, thus prepared bead cores are used in the bead portions. Then, the carcass is rolled up from the inside in the axial direction of the tire toward the outside around the bead portion, the thus obtained bead portion around which the carcass is rolled up, a carcass rubber, a rubber for side wall and materials for tread are assembled into a state of the tire, and the vulcanization is conducted to give a tire.

The kinds of the carcass, carcass rubber, rubber for side wall and materials for tread and the conditions for assembling, forming and vulcanizing are not particularly limited, and materials and conditions which are usually adopted can be applicable to the preparation of the tires of the present invention.

The thus prepared tires of the present invention have excellent adhesion between the plated bead wire and the rubber layer, so it is difficult to cause the wild wires, since in the tires of the present invention, the rubber-coated bead wires comprising the plated bead wires having the Cu/Sn deposit having the specific composition in the specific amount, the plating being capable of giving the excellent adhesion between the plated bead wire and the rubber layer and excellent properties to the tire, and the rubber layer formed on the bead wire from the specific composition are used. Accordingly, the tires of the present invention are particularly suitable for use of tires used under the conditions of heavy load and high speed such as tires for airplane.

The present invention is more specifically described and explained by means of the following Examples wherein all percent and parts are by weight unless otherwise noted. It is to be understood that the present invention is not limited to the Examples, and various changes and modifications may be made in the invention without departing from the spirit and scope thereof.

EXAMPLES 1 TO 4 AND COMPARATIVE EXAMPLES 1 TO 10

A steel wire was Cu/Sn-plated to give a bead wire having a Cu/Sn plating deposit having an Sn content of 8 %, 10 %, 12 % or 14 % in an amount of 0.55 g/kg, 0.65 g/kg, 0.75 g/kg or 0.90 g/kg, g/kg referring to deposit of plating in g to the core bead wire in Kg.

The plated bead wires of a length of 80 mm were embedded in a bead-coating rubber composition shown in Table 1, the vulcanization was conducted at a temperature of 150° C. for 35 minutes under a mold face pressure of 60±30 kg/cm$^2$ to give a sample having a thickness of about 14 mm and a space of the wires of about 12.5 mm. Then, the sample was allowed to cool at room temperature for not less than 12 hours, burrs were removed therefrom and bead wires sticking out from the rubber were cut off with a grinder or nipper. The obtained sample was drawn at a drawing rate of 50 mm/minute in a drawing slit width of 8 mm to measure a drawing strength and a percentage of bead wires having no metal gloss to which the rubber adhered (a percentage of the bead wires to which the rubber adhered).

The results are shown in Table 2.

TABLE 1

| Bead-coating rubber composition | A | B | C |
| --- | --- | --- | --- |
| Composition (part) | | | |
| Natural rubber | 100 | 100 | 75 |
| SBR | — | — | 25 |
| FEF | 120 | 120 | 120 |
| Stearic acid | 2 | 4 | 2 |
| Zinc white | 15 | 5 | 5 |
| Sulfur | 6 | 4 | 4 |
| Vulcanization accelerator | | | |
| MOR | 0.5 | 0.9 | 0.9 |
| DZ | 0.4 | — | — |
| Property of the composition* | | | |
| Minimum torque (kg · cm) | 4.0 | 4.3 | 5.1 |
| Scorch time, t$_2$ (minute) | 4.3 | 6.3 | 8.3 |
| 90%-vulcanization time (minute) | 20.0 | 16.8 | 19.8 |
| Maximum torque (kg · cm) | 49.4 | 43.1 | 41.3 |

(Note)
*measured by a CurelastometerIII (@ 150° C.) commercially available from Japan Synthetic Rubber Co., Ltd.

TABLE 2

| | Deposit | | Drawing strength (kg/wire) [Percentage of wires to which the rubber adhered (%)] | | |
| --- | --- | --- | --- | --- | --- |
| | Sn content (%) | Amount of deposit (g/kg) | Composition A | Composition B | Composition C |
| Com. Ex. 1 | 8 | 0.65 | 125 [45] | 115 [25] | 95 [15] |
| Com. Ex. 2 | 8 | 0.75 | 125 [40] | 130 [45] | 65 [0] |
| Com. Ex. 3 | 8 | 0.90 | 115 [45] | 120 [50] | 70 [5] |
| Com. Ex. 4 | 10 | 0.55 | 120 [60] | 90 [30] | 85 [15] |
| Ex. 1 | 10 | 0.65 | 135 [70] | 120 [50] | 80 [10] |
| Ex. 2 | 10 | 0.75 | 140 [70] | 125 [55] | 90 [15] |
| Com. Ex. 5 | 10 | 0.90 | 140 [75] | 125 [55] | 110 [40] |
| Com. Ex. 6 | 12 | 0.55 | 125 [60] | 100 [35] | 90 [30] |
| Ex. 3 | 12 | 0.65 | 135 [70] | 125 [55] | 85 [25] |
| Ex. 4 | 12 | 0.75 | 140 [80] | 130 [60] | 85 [25] |
| Com. Ex. 7 | 12 | 0.90 | 125 [60] | 120 [45] | 100 [30] |
| Com. Ex. 8 | 14 | 0.55 | 110 [35] | 90 [20] | 120 [55] |
| Com. Ex. 9 | 14 | 0.65 | 110 [45] | 100 [35] | 95 [40] |
| Com. Ex. 10 | 14 | 0.75 | 105 [30] | 105 [40] | 100 [45] |

From the results of the drawing strength and the percentage of bead wires to which the rubber adhered as to the bead-coating rubber compositions, A, B and C as shown in Table 2, it would be understood that the most preferable Sn content of the deposit was 12 % and the amount of the plating deposit was 0.75 g per kilogram of the wire.

EXAMPLE 5 AND COMPARATIVE EXAMPLE 11

A steel wire was Cu/Sn-plated in the approximately same manner as in Example 4 to give a bead wire having a Cu/Sn deposit having an Sn content of 12.3 % in an amount of 0.74 g/kg of the core bead wire. The pleated bead wire was coated with the bead-coating rubber composition B shown in Table 1 in a thickness of 0.3 mm. The eight rubber-coated bead wires arranged side by side in a row were circularly wound 10 turns so as to set a turn on a previous turn, the same rubber as used in the bead-coating rubber composition B was wound around the wound bead wires in a thickness of 1 mm, around which a canvas for wrapping bead wires coated with a rubber was further wound to produce a bead core. Using the obtained bead cores, tires for an airplane, H 46×18.0-20, were made, and the tires were run under TSO C62C running conditions. Then, the rubber-coated bead wires were sampled from the tires, and the drawing test was conducted four times in the same manner as in Example 1 to give percentages of bead wires to which the rubber adhered.

The procedure of Example 5 was repeated except that a plated bead wire having a Cu/Sn deposit having an Sn content of 12.2 % in an amount of 0.55 g/kg was used to give a rubber-coated bead wire. Then, using the rubber-coated bead wires, tires were prepared and the running test was conducted in the same manner as in Example 5. After sampling the rubber-coated bead wires from the tested tires, the drawing test was conducted in the same manner as in Example 5 to give percentages of bead wires to which the rubber adhered (Comparative Example 11).

The results are shown in Table 3.

TABLE 3

| | Sn-content (%) | Amount of Cu/Sn-deposit (g/kg) | Percentage of bead wires to which the rubber adhered (N = 4) |
|---|---|---|---|
| Ex. 5 | 12.3 | 0.74 | 50, 60, 65, 65 |
| Com. Ex. 11 | 12.2 | 0.55 | 30, 35, 40, 40 |

EXAMPLE 6

A steel wire was Cu/Sn-plated to give a bead wire having a deposit having an Sn content of 12.0 % and a Cu content of 88.0 % in an amount of 0.75 g/kg of the core bead wire (the same plated bead wire as obtained in Ex. 4). The rubber-coated bead wire was embedded in a bead-coating rubber composition of 100 parts of a natural rubber, 120 parts of carbon GPF, 2 parts of stearic acid, 15 parts of zinc white, 2 to 10 parts of sulfur and 0.30 to 1.10 parts of a vulcanization accelerator MOR in a length of 50 mm, the vulcanization was conducted at a temperature of 150° C. for 35 minutes under a mold face pressure of 60 ±30 kg/cm². Then, the procedure of Example 1 was repeated to give samples and the drawing test was conducted at a drawing rate of 50 mm/minute in a drawing slit width of 8 mm to measure drawing strengths and percentages of bead wires to which the rubber adhered.

Figure 2:
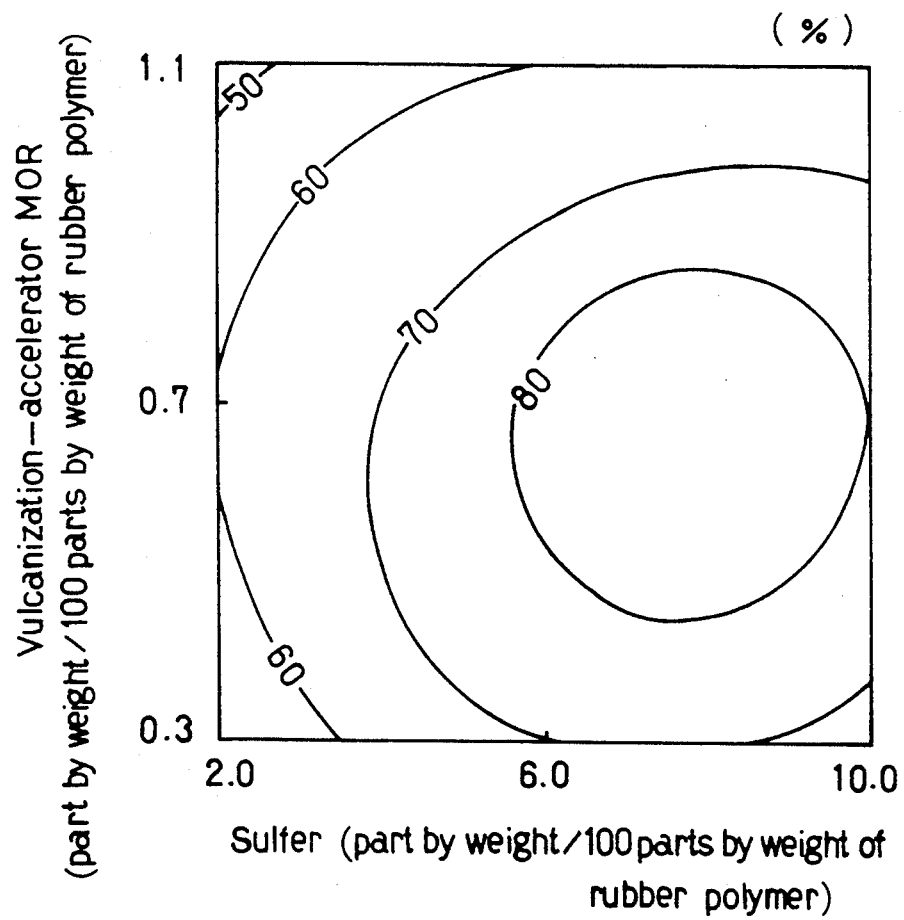
FIG. 2 is a graph showing how a percentage of bead wires to which a rubber adheres of the rubber-coated bead wires obtained in Example 6 varies depending on amounts of a vulcanization accelerator, MOR and sulfur.

The results are shown in FIGS. 1 and 2.

EXAMPLE 7 AND COMPARATIVE EXAMPLE 2

A steel wire was Cu/Sn-plated in the approximately same manner as in Example 6 to give a bead wire having a Cu/Sn deposit having an Sn... content of 12.3 % in an amount of 0.74 g/kg of the core bead wire. The plated bead wire was coated with a bead-coating rubber composition of 100 parts of a natural rubber, 120 parts of FEF, 6 parts of sulfur, 0.5 part of MOR and 0.2 part of DZ which were vulcanization accelerators, 15 parts of zinc white, and 2 parts of stearic acid, in a thickness of 0.3 mm. The eight rubber-coated bead wires arranged side by side in a row were wound 10 turns so as to set a turn on a previous turn, the same rubber as used in the bead-coating rubber composition was wound around the wound bead wires in a thickness of 1 mm, around which a canvas for wrapping bead wire coated with a rubber was further wound to give a bead core. Using the bead cores, tires for an airplane, H 46×18.0-20, were made, and the tires were run under TSO C62C running conditions. Then, the rubber-coated bead wires were sampled from the tires, the drawing test was conducted four times in the same manner as in Example 1 to give percentages of the bead wires to which the rubber adhered.

The procedure of Example 7 was repeated except that a plated bead wire having a Cu/Sn deposit, having an Sn content of 12.2 % in an amount of 0.55 g/kg of the wire was used to give a rubber-coated bead wire, and as the bead-coating rubber composition to be coated on the plated bead wire, the bead-coating rubber composition B shown in Table 1 was used. Using the bead wires, tires were made and the running test was conducted in the same manner as in Example 7 to give percentages of bead wires to which the rubber adhered (Comparative Example 12).

The results are shown in Table 4.

TABLE 4

| | Sn-content (%) | Amount of Cu/Sn-deposit (g/kg) | Percentage of bead wires to which the rubber adhered (N = 4) |
|---|---|---|---|
| Ex. 7 | 12.3 | 0.74 | 60, 70, 80, 80 |
| Com. Ex. 12 | 12.2 | 0.55 | 30, 35, 40, 40 |

As shown above, the bead wires of the present invention have the Cu/Sn deposit having a specific weight ratio of Cu and Sn in a specific amount, and are excellent in adhesion. Also, the rubber-coated bead wires of the present invention have the rubber layer having remarkably excellent adhesion to the plated bead wire as mentioned above on the plated bead wire. Accordingly, the plated bead wires, particularly the rubber-coated bead wires of the present invention have excellent adhesion between the plated bead wire and the rubber layer, and as to the tires using the bead wires of the present invention, it is difficult to cause the wild wires.

In addition to the ingredients used in Examples, other ingredients can be used in the Examples as set forth in the specification to obtain substantially the same results.

What we claim is:

1. A plated bead wire for use in tires comprising a core bead wire and a Cu/Sn plating deposit on said core bead wire, said deposit consisting of an Sn content in a range of 9 to 13% by weight and a Cu content in a range of 91 to 87% by weight and said deposit being in an amount in a range of 0.65 to 0.85 g per kilogram of said core bead wire.

* * * * *